Dec. 16, 1952  R. F. GARBARINI  2,621,495
COUPLING TO PRODUCE ROTARY DISPLACEMENT BETWEEN
A DRIVING MEMBER AND A DRIVEN MEMBER
Filed Oct. 2, 1947

INVENTOR.
ROBERT F. GARBARINI
BY
Herbert W. Thompson
his ATTORNEY.

Patented Dec. 16, 1952

2,621,495

UNITED STATES PATENT OFFICE 2,621,495

COUPLING TO PRODUCE ROTARY DISPLACEMENT BETWEEN A DRIVING MEMBER AND A DRIVEN MEMBER

Robert F. Garbarini, Woodside, N. Y., assignor to The Sperry Corporation, a corporation of Delaware Application October 2, 1947, Serial No. 777,435

7 Claims. (Cl. 64—24)

This invention relates to a three dimensional cam computer and has for its object the provision of a simplified cam apparatus wherein it is necessary to displace a three dimensional cam in but one dimension.

The invention contemplates a three dimensional cam apparatus for solving equations of certain type in which the cam is displaced in one dimension according to a given variable and the cam follower is directly displaced by an independent input in accordance with a second variable. The cam is laid out to further displace the cam follower according to a predetermined function of both variables, which function is in the nature of a correction. The correction function is added algebraically to the output of the device. There is a minimum of backlash in the arrangement disclosed, a differential mechanism of the conventional type is eliminated, the device occupies less space than former apparatus for performing equivalent calculations and is generally cheaper to manufacture and assemble.

The invention will now be described with reference to the accompanying drawings, of which Fig. 1 is a perspective view of a cam mechanism in accordance with a preferred embodiment of the invention;

Figure 1:
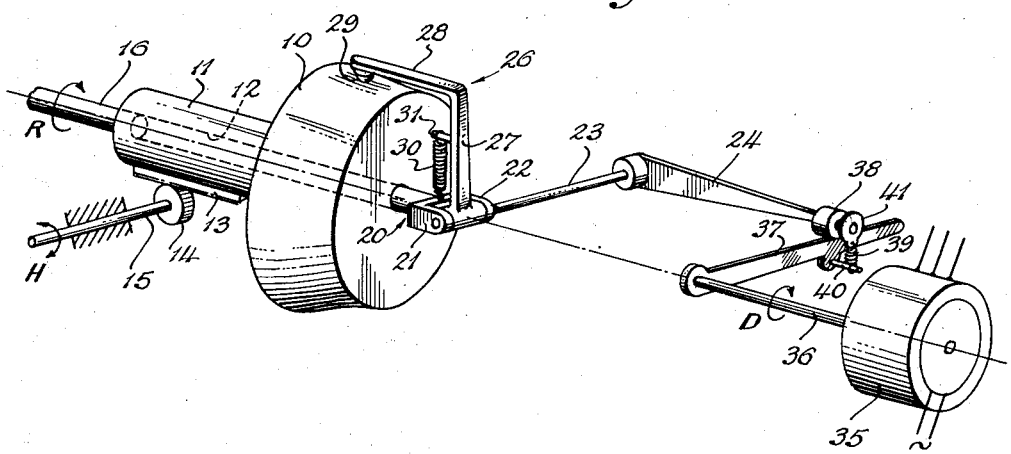
Figure 2:
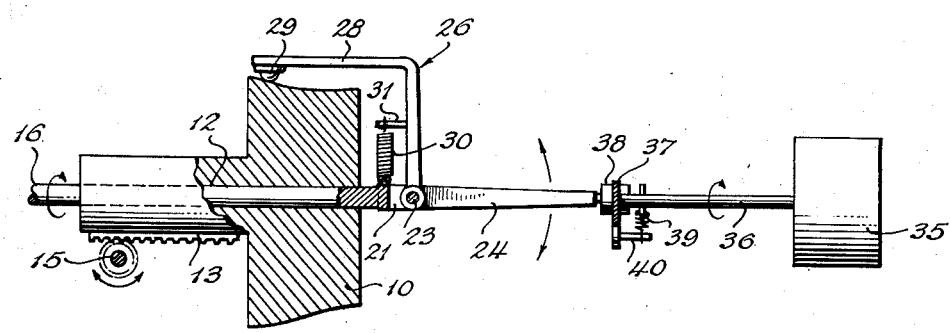
Fig. 2 is a vertical section taken through the axis of the cam of Fig. 1.

Referring now to the drawings, cam 10 is fixed to a shank 11 formed with a central bore which extends through the cam along the axis thereof.

The shank 11 is supported for translation in the present embodiment of the invention, by any suitable bearing arrangement which has been omitted from the drawings for the sake of clarity. The cam is movable in translation by a rack 13 fixed to shank 11. A gear 14 fixed to an input shaft 15 and meshing with rack 13 provides a means for adjusting the cam in translation.

A second input shaft 16 extends through the bore 12 of the shank 11 and cam 10 and is supported thereby for rotation.

A yoke 20 having arms 21 and 22 is formed integrally, or otherwise fixed to shaft 16 at one end thereof. A shaft 23 having an arm 24 fixed at one end, has the opposite end portion supported for rotation by suitable bearings carried by arms 21 and 22 of the yoke 20.

A cam follower 26 disposed between arms 21 and 22 of the yoke is fixed to shaft 23. The cam follower 26 projects upwardly from shaft 23 until the edge of the cam is cleared by an approximately vertical portion 27 and is then turned at an angle to form an approximately horizontal portion 28 overlying the surface of cam 20. A spherical member 29 supported near the end of the horizontal section 28 of the cam follower rides on the surface of the cam and is kept in engagement therewith by a spring 30 fastened at one end to a spring post 31 fixed to the part 27 of the cam follower, and at the other end to an eyelet projecting upward from the midpoint of yoke 20. It will be understood that with the arrangement just described, relative movement of the cam and follower will effect a corresponding rocking movement of the follower together with shaft 23 and arm 24 to which it is attached.

The output displacement of arm 24 is utilized in the present embodiment of the invention to effect a corresponding movement of the rotor member of a synchro transformer 35 which may be of any suitable type.

Synchro transformer 35 is supported by means not shown so that the rotor shaft 36 thereof is in co-alignment with shaft 16. An arm 37 fastened to shaft 36 engages a roller 38 supported by a round portion formed near the end of arm 24. Arm 37 is held in engagement with roller 38 so that the former follows any movement of arm 24 by means of a spring 39, one end of which is held by spring post 40 fixed to arm 37, the other being attached to an opening in a plate 41 which is free to turn on arm 24 near the end thereof. With the arrangement just described the rotor shaft 36 of the synchro transformer 35 will follow the movements of the cam follower without play or backlash. The synchro transformer may be used as desired to control the input of an amplifier or a suitable receiver, not shown.

The mechanism just described may be used for the purpose of solving equations where the output of the device is a function of two variables. More specifically, the invention is for solving equations where the output can be written as the sum of one of the variables and a correction which is a function of both variables.

The output of such a mechanism is capable of driving a synchro transmitter or receiver, a dial or other device through more than one revolution but the data repeats with each revolution.

An illustration of the type problem for which the computer is adapted, is solving for slant range D from altitude H and ground range R, which is a conventional problem for gun fire control given by the following equations:

$$D = \sqrt{R^2 + H^2} \qquad (1)$$

This equation may be written $$D = R + \sqrt{R^2 + H^2} - R \quad (2)$$
$$D = R + f(R+H) \quad (3)$$

where $$f(R,H) = \sqrt{R^2 + H^2} - R \quad (4)$$

Figure 3:
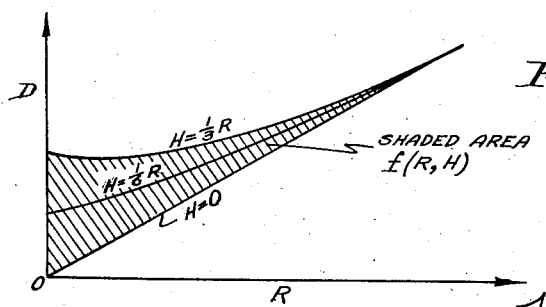
Fig. 3 is a diagram showing curves for the layout of one type of cam.

Equation 3 shows that slant range D is equal to R plus a function of R and H. Hence, for those conditions where the maximum correction is equal or less than one-half the maximum output, it is more desirable to put the correction function on a three dimensional cam and add to it one of the basic input functions, than it is to put the entire function on the cam because in the latter case poor scale factors and high cam slopes would be encountered. The curves of Fig. 3 show graphically the relation of different functions of R and H for the above problem.

The device operates as follows: Input shaft 16 is rotated in accordance with horizontal or ground range R. The swinging cam follower 26 turns therewith over the surface of non-rotary cam 10. Thaft 15 translates cam 10 in accordance with altitude, H. As the shaft 16 is rotated and the cam translated, the cam follower 26 rocks shaft 23 to which it is fixed. The spring loaded crank 37 of the synchro transformer is rotated through an angle due to the rotation of shaft 16 and is differentially advanced by $f(R,H)$ in an algebraic sense by the swinging cam follower arm 26. All nonlinearities of the swinging cam follower are corrected in the design of the cam.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a computer of the type described, a three dimensional cam, an input shaft supported for rotation relative to said cam, a yoke secured to the input shaft at one end thereof, an output shaft supported for rotation by the yoke having a portion projecting considerably beyond the yoke, a cam follower engaging the surface of the cam fixed to the output shaft between the arms of the yoke, a spring connected between the yoke and the cam follower for maintaining the same in contact with the cam, and a second input shaft coupled with the cam and having means effective to displace the same in one dimension with respect to the cam follower.

2. In a computer of the type described, a three dimensional cam, means for adjusting the position of the cam in an axial direction in accordance with a first variable, an input shaft supported for rotation in accordance with a second variable, the cam being laid out empirically in accordance with predetermined functions of both variables, an output shaft supported for rotation by the first mentioned shaft at the end thereof and at right angles thereto, a cam follower fixed to the output shaft and spring means for holding the cam follower in engagement with the surface of the cam, the arrangement being such that as the output shaft is turned by the input shaft, the movement of the follower over the cam imparts a rocking motion to the output shaft in accordance with said functions of both variables.

3. In a computer of the type described, a three dimensional cam formed with a central bore, an input shaft extending through the bore and supported for relative rotation therein, a cam follower pivotally supported by one end of the shaft and engaging the surface of the cam, a second input shaft having means effective to adjust the cam in translation with respect to the shaft, an output shaft coupled with the cam follower and aligned with its pivotal axis adapted to be displaced by the relative movements of the cam and cam follower, an arm fixed to the output shaft, and a transmitting device coupled with the arm and controlled by the movements thereof.

4. In a computer of the type described, a three dimensional cam, means for moving the cam in translation, an input shaft supported for rotation relative to said cam, a yoke fixed to the end of the shaft, an output shaft supported near one end for rotation by the arms of yoke at right angles to the input shaft, a cam follower disposed between the arms of the yoke and fixed to the output shaft, an arm fixed at the end of the output shaft remote from the yoke, a transmitting device comprising a rotary transformer having a shaft disposed in co-alignment with the input shaft, an arm on the transformer shaft engaging that on the output shaft, whereby the transformer shaft follows the motion of the arm on the output shaft.

5. In a computer of the type described, a three dimensional cam formed with a central bore, means for moving the cam in translation, an input shaft extending through the bore and supported therein for rotation a yoke fixed to the end of the shaft, an output shaft supported near one end by the arms of the yoke at right angles to the input shaft, a spring pressed cam follower fixed to the output shaft disposed between the arms of the yoke and shaped so as to engage the surface of the cam, an arm fixed to the output shaft near the end remote from the yoke, a transmitting device comprising a rotary transformer having a shaft disposed in co-alignment with the input shaft, an arm on the transmitting shaft engaging that on the output shaft, and spring means holding the respective arms in engagement whereby the transformer shaft is actuated according to the rotation of the input shaft as well as by a rocking movement imparted to the output shaft due to movement of the cam follower over the cam.

6. In a computer of the type described, a three dimensional cam, means for adjusting the position of the cam in an axial direction in accordance with a first variable, an input shaft supported for rotation relative to said cam in accordance with a second variable, the cam being laid out empirically in accordance with predetermined functions of both variables, an output shaft supported for rotation by the first mentioned shaft at the end thereof and at right angles thereto, a follower for the cam fixed to the output shaft, an arm fixed to the output shaft, a rotary transformer having a shaft disposed in co-alignment with the input shaft, an arm fixed to the transformer shaft engaging the arm on the output shaft and spring means holding the arms in engagement whereby the transformer shaft is turned in accordance with the angular motion of the input shaft as well as by the rocking movement imparted to the output shaft by the cam follower as it passes over the surface of the cam.

7. In a computer of the type described, a three dimensional cam, means for adjusting the position of the cam in an axial direction in accordance with a first variable, an input shaft mounted to be turned on its axis in accordance with a second variable, the cam being laid out empirically in accordance with a predetermined function of both variables, a yoke fixed at one end of the input shaft, an output shaft supported near one end for rotation in the yoke, the output shaft projecting from the yoke at right angles to the input shaft, a follower for the cam disposed between the arms of the yoke and fixed to the output shaft, an arm fixed to the output shaft near the end thereof remote from the yoke, a transmitting device having a shaft disposed in spaced relation with the input shaft and in co-alignment therewith, an arm fixed to the shaft of the transmitting device engaging the arm on the output shaft, and spring means holding the arms in engagement whereby the shaft of the transmitting device is turned in accordance with the movements of the arm on the output shaft.

ROBERT F. GARBARINI.

REFERENCES CITED

The following references are of record in the file of this patent:

UNITED STATES PATENTS

| Number | Name | Date |
| --- | --- | --- |
| 2,415,157 | Bedford | Feb. 4, 1947 |